United States Patent
Sprague et al.

(10) Patent No.: US 7,545,981 B2
(45) Date of Patent: Jun. 9, 2009

(54) DOCUMENT IMAGE RE-ORDERING SYSTEMS AND METHODS

(75) Inventors: Mary Ann Sprague, Macedon, NY (US); Anne Stimson, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 678 days.

(21) Appl. No.: 11/266,964

(22) Filed: Nov. 4, 2005

(65) Prior Publication Data
US 2007/0104366 A1 May 10, 2007

(51) Int. Cl.
*G06K 9/34* (2006.01)
(52) U.S. Cl. .................................. 382/176; 382/173
(58) Field of Classification Search ............... 382/173, 382/175, 176, 180, 218, 228, 305, 312; 715/243, 715/254, 256, 273, 277; 707/7, 100
See application file for complete search history.

(56) References Cited

U.S. PATENT DOCUMENTS

| | | | |
|---|---|---|---|
| 5,461,459 A | 10/1995 | Muramatsu et al. | |
| 5,465,304 A * | 11/1995 | Cullen et al. | 382/176 |
| 5,553,217 A * | 9/1996 | Hart et al. | 715/210 |
| 5,745,600 A * | 4/1998 | Chen et al. | 382/218 |
| 6,009,196 A * | 12/1999 | Mahoney | 382/176 |
| 6,175,844 B1 * | 1/2001 | Stolin | 715/210 |
| 6,377,704 B1 * | 4/2002 | Cooperman | 382/176 |
| 6,397,213 B1 * | 5/2002 | Cullen et al. | 707/5 |
| 6,411,733 B1 | 6/2002 | Saund | |
| 6,519,362 B1 * | 2/2003 | Cusmariu | 382/176 |
| 2003/0152289 A1 | 8/2003 | Luo | |
| 2003/0215137 A1 | 11/2003 | Wnek | |
| 2004/0243601 A1 * | 12/2004 | Toshima | 707/100 |
| 2005/0146756 A1 | 7/2005 | Shimizu | |

* cited by examiner

*Primary Examiner*—Kanji Patel
(74) *Attorney, Agent, or Firm*—Gibb I.P. Law Firm, LLC (57) ABSTRACT

Embodiments herein acquire an image containing text, identify distinct regions of text within the image (using, for example, a document model), and separate sub-images of the image according to the distinct regions of text. The embodiments can then order the sub-images according to a predetermined order (which may be different than the order that the sub-images appeared in the original image) and display the regions of text in this predetermined order. The method and system presented herein make the graphic user interface more user-friendly by potentially changing the manner (order) in which the regions of text are displayed.

20 Claims, 5 Drawing Sheets

DOCUMENT IMAGE RE-ORDERING SYSTEMS AND METHODS

BACKGROUND

Embodiments herein generally relate to systems that process images, such as images of magazine articles. When a magazine article or similar document is scanned to electronic format, the multiple columns can be difficult to read on a computer screen. The user must scroll down to read the bottom of the first column, then scroll up to start the second and subsequent column, increasing the reading time of the document. This continued scrolling up and down is time consuming and frustrating to the reader.

SUMMARY

A method embodiment herein acquires an image containing text, identifies distinct regions of text within the image (using, for example, a document model), and separates, generates, or extracts pixel groupings (sub-images) from the image according to the distinct regions of text. The method can then order the sub-images according to a predetermined order (which may be different than the order that the sub-images appeared in the original image) and display the regions of text in this predetermined order. The method and system presented herein make the graphic user interface more user-friendly by potentially changing the manner (order) in which the images of regions of text are displayed.

Thus, the method re-orders images of text so that they can be read from top to bottom, without having to continually jump from one area of the image to another area of the image, as occurs when reading text printed in columns on a graphic user interface display that is too small to clearly display all columns simultaneously. While embodiments herein can be used with optical character recognition (OCR) processes, one feature is that the method can avoid the need to recognize characters within the regions of text. Therefore, in some embodiments, the method presented herein avoids the overhead and resource consumption associated with optical character recognition and, instead, creates separate sub-images of the different regions of text within the image and displays these sub-images in the most easily readable order.

In one embodiment, the predetermined order comprises a linguistic reading order progression of items for a given language that is determined by the rules of a given written language. For example, in many western languages, the ordering of the sub-images ranks items on a left side of the image higher than items on a right side of the image and ranks items at a top of the image higher than items at a bottom of the image because in many western languages words are read from left to right and top to bottom. In many eastern languages, words are read from top to bottom and right to left. Therefore, in applications for eastern languages, items on the right side of the image are ranked higher than items on the left side of the image. Before performing such ordering processes the method can detect an orientation of the image to determine which is the left side, right side, top and bottom of the image.

In additional embodiments, the method compares the size of a graphic user interface display with a size of the distinct regions of text. If the size of the distinct regions of text do not match the size of the graphic user interface display, the method can change the magnification of the distinct regions of text (up or down) to compensate for size differences between the graphic user interface display and the distinct regions of text.

Alternatively, if the distinct regions of text are too large for the graphic user interface display, the method can divide the images of individual lines of text into two or more sections, and simultaneously display all sections of a line of text (one below another) to allow the user to simultaneously view a complete line of text (possibly in multiple sections) on the graphic user interface display. Therefore, for example, if one of the regions of text has a width greater than a width of the graphic user interface display (and possibly no reduction of magnification of the image can clearly show the entire line of text on the graphic user interface display because of its width), the method separates sub-images of text lines within the first region of text. Then, when displaying this region of text, the displaying process can split each of the sub-images of text lines into at least two portions, such that a first portion of each of the sub-images of text lines is displayed above a corresponding second portion of the sub-images of text lines. By splitting each of the sub-images of the text lines, all portions of at least one text line from the first region are simultaneously visible on the graphic user interface display.

In another exemplary embodiment, the method can identify the distinct regions of text as side-by-side columns. In such a situation, the ordering process and the displaying process change the presentation (ordering) of the images of the columns such that the columns are displayed above and below each other instead of side-by-side.

A system embodiment herein comprises a scanner adapted to acquire an image containing text and a document analyzer in communication with the scanner. The document analyzer is adapted to identify distinct regions of text within the image. Further, a pixel storage and processing unit is in communication with the document analyzer. The pixel storage and processing unit is adapted to generate sub-images from the image according to the distinct regions of text. A processor is in communication with the pixel storage and processing unit and is adapted to order the sub-images according to a predetermined order. Finally, a graphic user interface is in communication with the processor and is used to display the regions of text in the predetermined order.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As discussed above, when a magazine article or similar document is scanned to electronic format, the multiple columns can be difficult to read on a computer screen. In order to address these issues, one solution when scanning a document, such as a multiple column magazine article, is to perform OCR and other services on the document, possibly including converting the data to XML, for redisplay and layout of the document in a single column format for easier online reading. However, OCR processes are often resource intensive. Therefore, in some embodiments presented below, the need to use OCR processing is eliminated.

The embodiments described below allow a user to scan a document. The scanned document is processed so as to discern the columns of the article and concatenate images of the columns to present a continuous readable column of text. Providing the continuous column of text allows the user to read down the document by scrolling in one direction without having to scroll up and down multiple times to read a single article.

The reorganization of a scanned article into a continuous column of text could be achieved through several means of document manipulation. One such way is to OCR the text and concatenate the text into a continuous column. Another way is to use the automatic document layout processes to provide a layout of images (sub-images) that is acceptable to accelerated online viewing.

The reordering of the document image accomplished with embodiments herein could also be an option that could be selected in addition to scanning a document to PDF or for email delivery. In this way the readable online document would be an option that would be selected during the normal scan operations. It could also be a single option only for online viewing.

Figure 1:
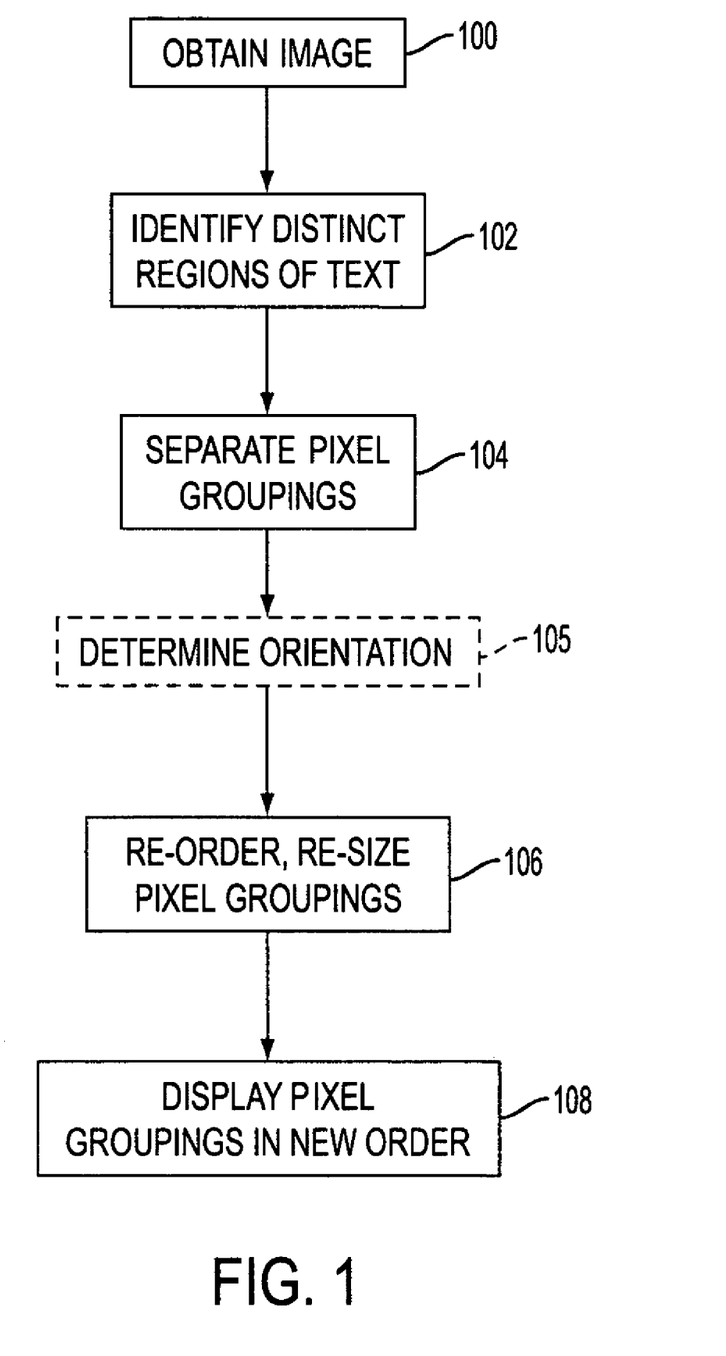
FIG. 1 is a flow diagram representing aspects of embodiments herein.
Figure 4:
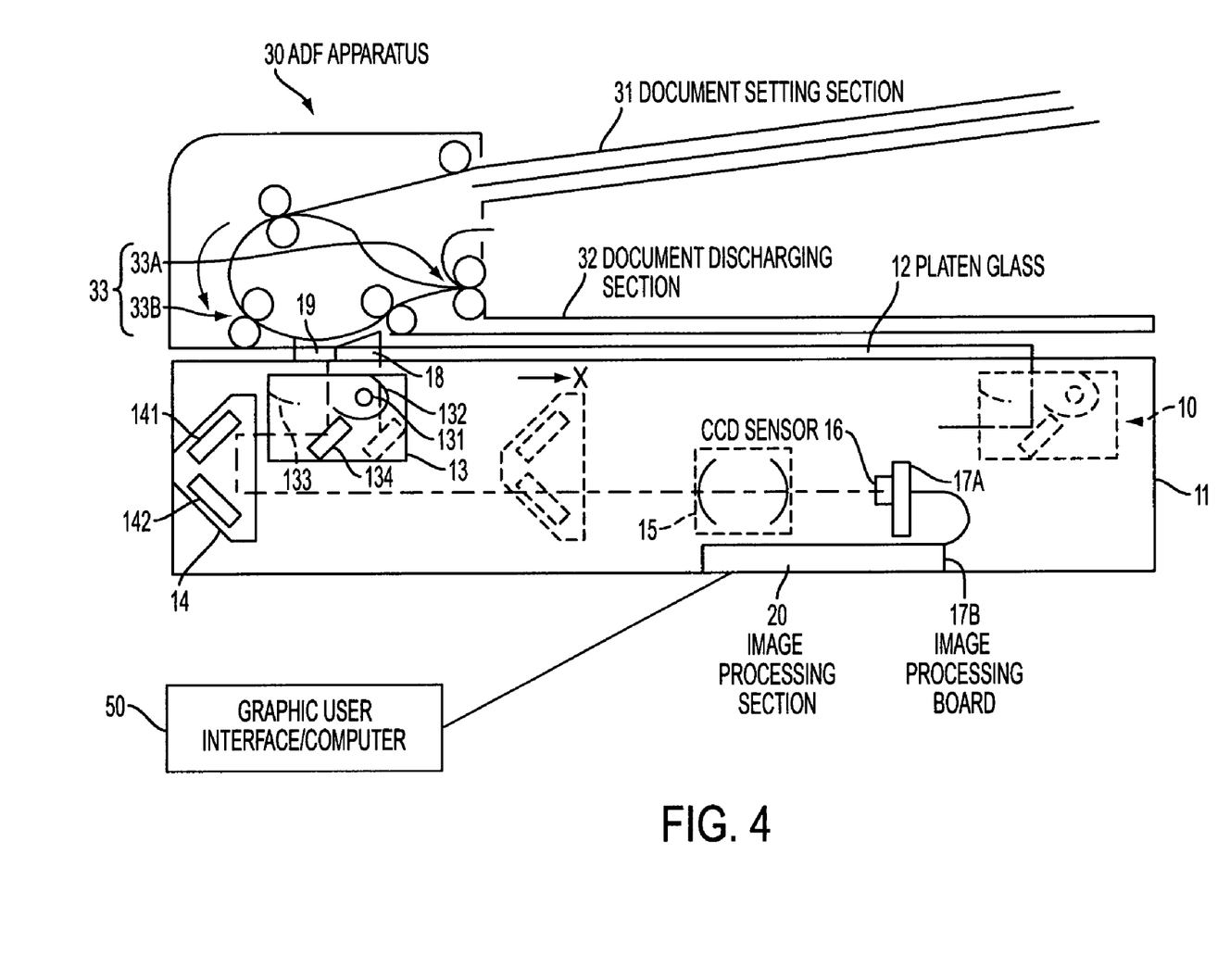
FIG. 4 is a schematic representation of an image scanning device according to embodiments herein.

FIG. 1 illustrates some aspects of embodiments herein in flowchart form. The flowchart shown in FIG. 1 begins by acquiring an image containing text (item 100) using, for example, a scanner or obtaining a pixelized image from another source such as a database. FIG. 4 illustrates a scanner that can be used with embodiments herein, such as a CVT scanner/document handler that is similar to an automatic document feeder disclosed in U.S. Patent Publication 2005/0146756, the complete disclosure of which is incorporated herein by reference.

More specifically, FIG. 4 is a side sectional view showing the outline of the configuration of an image reading apparatus. As shown in FIG. 4, an image reading apparatus of this example includes a document reading section 10, an image processing section 20, and an ADF (Automatic Document Feeder) apparatus 30 functioning as a platen cover as well and not having a circulation function. This image reading apparatus is used as an image reading apparatus of an image processing apparatus having, for example, at least a function of reading document images, such as a scanner, a copier, a facsimile, or a multi-function device having their functions.

The document reading section 10 includes a housing 11, a platen glass (document mounting stand) 12, a full rate carriage 13, a half rate carriage 14, a lens 15, and a CCD sensor 16. The platen glass 12 is formed of transparent glass disposed on the housing 11. A sheet-type document to be read is mounted on the platen glass 12.

The full rate carriage 13, disposed below the platen glass 12 within the housing 11, includes: a light source 131 that applies light toward a face opposite to a document mounting face of the platen glass 12; a substantially concave reflector 132 and a reflection mirror 133 that reflect light emitted from the light source 131 to the platen glass 12; a reflection mirror 134 that changes an optical path of reflected light from the platen glass 12 in a direction substantially parallel to the platen glass 12. As the light source 131, a fluorescent lamp with a longitudinal direction as a fast-scanning direction (a direction orthogonal to paper surface) is used.

The half rate carriage 14 includes two reflection mirrors 141 and 142 disposed to form substantially a right angle, and successively changes optical paths of reflected light passing through the full rate carriage 13 by 90 degrees at a time. The full rate carriage 13 and the half rate carriage 14, driven by e.g., a stepping motor (not shown in the drawing), are configured to reciprocally travel in a slow-scanning direction (a direction indicated by the arrow X in the drawing) and a direction opposite to it in conjunction with each other.

The lens 15 gathers reflected light inputted from the platen glass 12 via the full rate carriage 13 and the half rate carriage 14 onto an imaging face of the CCD sensor 16, which is a solid-state image sensor. By receiving the reflected light gathered by the lens 15, the CCD sensor 16 senses the image of a document mounted on the platen glass 12 in the fast-scanning direction and successively outputs analog image signals corresponding to the density of the image (corresponding to the intensity of the reflected light).

As the CCD sensor 16, if the image reading apparatus supports monochrome images, one line sensor is formed on a semiconductor board (not shown), while if the image reading apparatus supports color images, three line sensors corresponding to the three colors, R (red), G (green), and B (blue) are formed on the semiconductor board at prescribed intervals so that the three light components can be detected. If the image reading apparatus supports monochrome and color images, one line sensor for monochrome images and three line sensors for the R, G, and B colors are formed on the semiconductor board at prescribed intervals.

The CCD sensor 16 is disposed on a board 17A together with a read signal processing section (not shown) including a drive control section such as a CCD driver for driving the CCD sensor 16. An analog video signal outputted from the CCD sensor 16, after being subjected to predetermined signal processing in the read signal processing section, is sent to the image processing section 20 disposed on an image processing board 17B.

The ADF apparatus 30 includes: a document setting section 31; a document discharging section 32; and pairs of various feeding rolls such as a pair of registration rolls 33A and a pair of exit rolls 33B for forming a document feeding path. A guide 18 is provided at a left edge of the drawing in the platen glass 12 above the housing 11. In the immediate neighborhood of the guide 18, a light-permeable contact glass 19 (readout glass) is disposed.

In the image reading apparatus configured as described above, the full rate carriage 13 of the document reading section 10 forming a readout optical system is usually in a home position. During feed reading in which an image of a document is read while the document is fed by the ADF apparatus 30, the full rate carriage 13 is fixed (locked for halt) in an arbitrary position below the contact glass 19, which is on a document feeding path of the ADF apparatus 30.

Specifically, the full rate carriage 13 moves or moves under exposure scanning in the direction opposite to the arrow X from the home position, and is locked for halt in a feed read image tip position. At this time, the CCD sensor 16 and the read signal processing section go into an imaging wait state. Thereafter, an exposure start permission signal is sent from a CPU of a main unit (not shown) to the ADF apparatus 30. Upon receiving the exposure start permission signal, the ADF apparatus 30 starts to feed a document set on the document setting section 31.

When the document is guided toward the guide 18 via the predetermined feeding paths including the various pairs of feeding rolls 33 and the tip of the document reaches the feed read image tip position via the pair of registration rolls 33A, an image tip detection signal is sent from the ADF apparatus 30 to the document reading section 10, when reading of the document image is started. The circumferential speeds of the pairs of feeding rolls 33 such as the pair of registration rolls 33A and the pair of exit rolls 33B are controlled to be constant, whereby the document passes on the contact glass 19 at a substantially constant speed and is discharged to the document discharging section 32 by the pair of exit rolls 33B.

By the abovementioned series of operations, in the image reading apparatus, image reading based on the so-called CVT (Constant Velocity Transfer) method is performed. According to this method, during feed reading, an image of a document to be read is read while the document is fed at a constant speed.

On the other hand, during stationary reading in which an image of a document is read with the document being mounted on the platen glass 12, the document is mounted on the platen glass 12 manually (or by the ADF apparatus 30) and fixed in an arbitrary position on the platen glass 12 so that the readout optical system including the full rate carriage 13 and the half rate carriage 14 is moved for scanning at a constant speed in the direction of the arrow X to read the document image.

Specifically, in the state in which the document mounted on the platen glass 12 is covered with the ADF apparatus 30, light from the light source 131 is applied on the document surface through the platen glass 12 and its reflected light is gathered on the imaging face of the CCD sensor 16 by the lens 15 after passing through the full rate carriage 13 and the half rate carriage 14. The CCD sensor 16 performs photoelectric conversion for the incident light on a pixel basis to read the document image by a prescribed resolution determined by the number of pixels and outputs an analog image signal. If the image reading apparatus supports color images, analog image signals of the R, G, and B color components are outputted from the CCD sensor 16.

During the reading, in order that irradiation light from the light source 131 is applied on the whole surface of the document and the CCD sensor 16 reads the whole input image through the readout optical system including the lens 15, the readout optical system including the full rate carriage 13 including the light source 131, the half rate carriage 14, or the lens 15, and the CCD sensor 16 move at a constant speed in the direction (slow-scanning direction) of the arrow X in FIG. 4.

By the abovementioned series of operations, in the image reading apparatus, during stationary reading, a document to be read is fixed on the platen glass 12, and the readout optical system including the full rate carriage 13 and the half rate carriage 14 is moved at a constant speed to read an image of the document.

The scanner shown in FIG. 4 includes a graphic user interface 50 or a connection to a separate computer or graphic user interface 50. Therefore, item 50 in FIG. 4 is intended to represent a graphic user interface that is part of the scanner or that is connected to the scanner by a wired or wireless local or wide area network. Thus, item 50 can represent a computer, personal digital assistant, cell phone, etc. that has the ability to display an image of text to a user. Such devices often have small display screens and the embodiments herein aid in presenting images of text on such devices by generating sub-images of the text images, reordering the text images, reducing the size of the text images, etc.

Referring again to FIG. 1, the embodiments herein next identify distinct regions of text within the image (using, for example, a document model) in item 102. More specifically, the embodiments herein use a document analyzer 500, which can be included as part of the image processing section 20 of the scanner shown in FIGS. 4 and 5 to identify different text regions using a document model that has information of size, shape, and spatial arrangement of possible or likely text regions. For example, U.S. Patent Publications 2003/0142112, 2003/0215137, and U.S. Pat. No. 6,411,733 the complete disclosures of which are incorporated herein by reference, describe processes for identifying text regions. Such systems may produce regions corresponding to authors, titles, tables, etc., without having to recognize the text. The analysis can be done using size, shape, and spatial arrangements of connected components or by recognizing the telltale patterns of alpha-numeric characters aligned as text.

Figure 2:
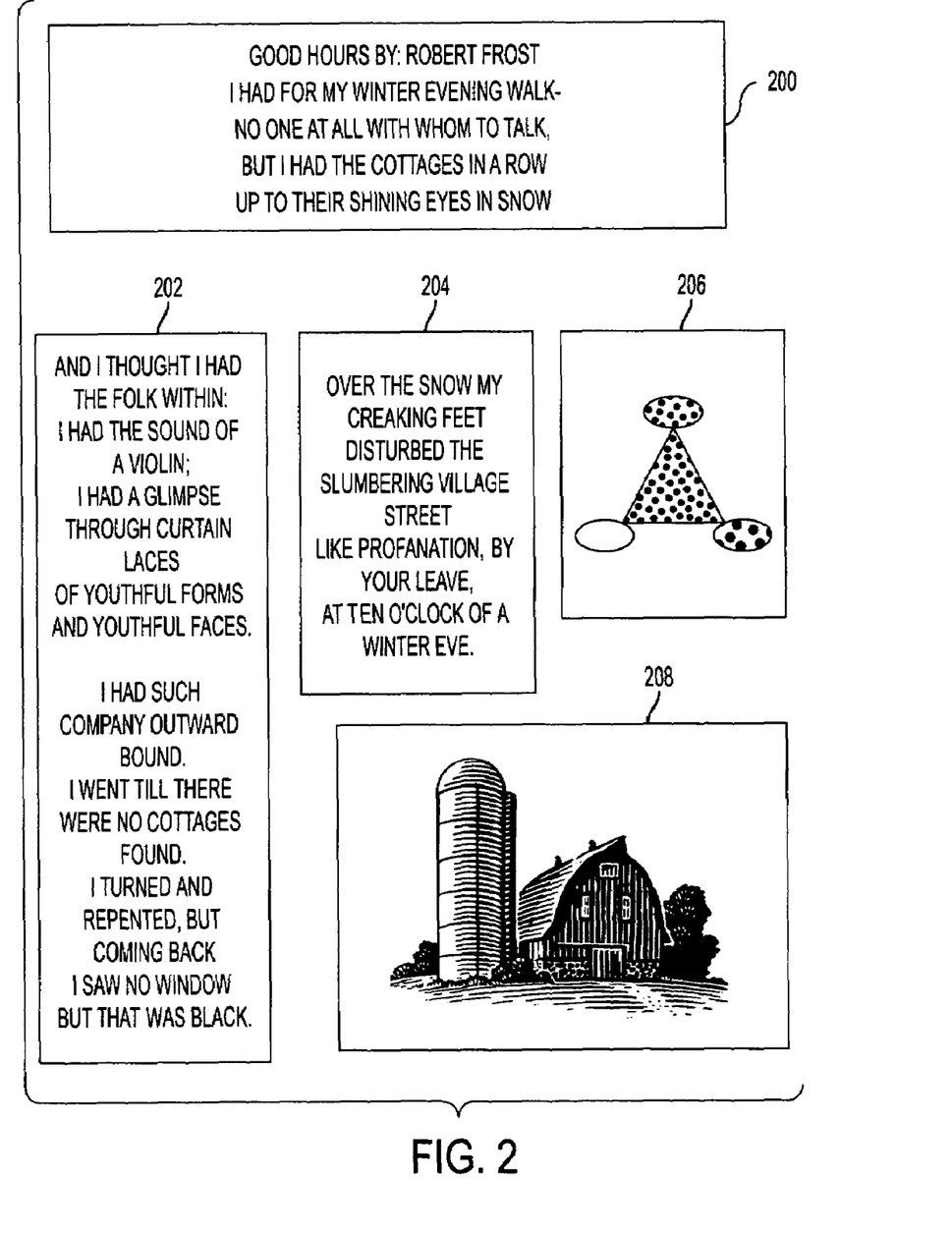
FIG. 2 is a schematic representation of an image containing text, graphics, and an image.

For example, FIG. 2 illustrates a scanned image that includes a first text region 200 that includes a first article, another article that appears in two columns 202, 204, a chart 206, and an image 208. The document analyzer uses previous document models to identify each region.

Referring once again to FIG. 1, the method embodiment next uses a pixel storage and processor 502 (FIG. 5) to generate sub-images from the image according to the distinct regions 200-208 of text, graphics, and images identified by the document analyzer 500 in item 104 of the flowchart in FIG. 1. The pixel storage and processor can comprise any computerized device that has the ability to store and process pixelized images by converting groups of pixels into separate items that can be sorted, such as separate files, separate logical units, etc. Therefore, any common computing device, microprocessor, with storage (random access memory, magnetic media storage, optical storage, etc.) can be used as the pixel storage and processor.

Figure 5:
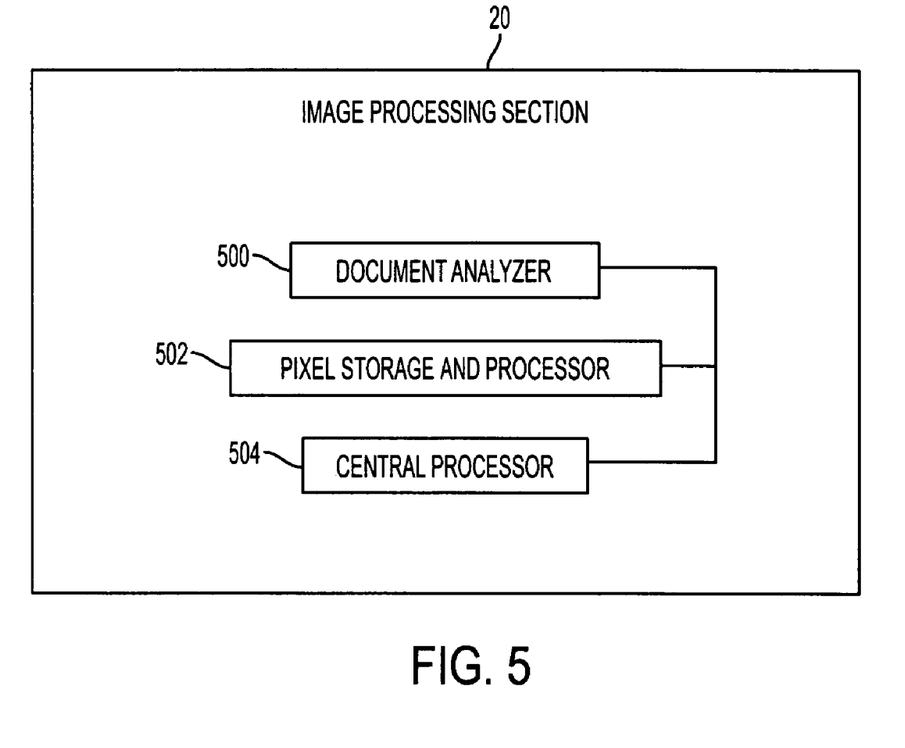
FIG. 5 is a schematic representation of an image processing device according to embodiments herein.

The method embodiments can then order (or re-order) the sub-images according to a predetermined order (which may be different than the order that the sub-images appeared in the original image) as shown by item 106 in FIG. 1 using the central processor 504 shown in FIG. 5. As shown in item 108, the method displays the regions of text in this new predetermined order on the graphic user interface 50.

In one embodiment, the predetermined order used by the central processor 504 comprises a linguistic reading order progression of items for a given language that is determined by the rules of a given written language. For example, in many western languages, the ordering of the sub-images ranks items on a left side of the image (e.g., item 202) higher than items on a right side of the image (e.g., item 204) and ranks items at a top of the image (e.g., item 200) higher then items at a bottom of the image (e.g., item 202) because in many western languages words are read from left to right and top to bottom. In many eastern languages, words are read from top to bottom and right to left. Therefore, in applications for eastern languages, items on the right side of the image are ranked higher than items on the left side of the image.

Before performing such ordering processes the method can optionally detect an orientation of the image to determine which is the left side, right side, top and bottom of the image as shown in optional item 105. Such orientation operations and systems are well-known. For example, U.S. Patent Publication 2003/0152289 (the complete disclosure of which is incorporated herein by reference) describes a method and system for determining image orientation. Similarly, U.S. Pat. No. 5,461,459 (the complete disclosure of which is incorporated herein by reference) describes a digital copier with an expanded user interface, in which an operator can specify the image orientation or where the image orientation can be determined automatically by analysis of the image data. Thus, for example, the direction of the text lines can be found by making a histogram of the black pixels for each of the two main axes of the document.

In additional embodiments, the method compares the size of a graphic user interface display with a size of the distinct regions of text. If the size of the distinct regions of text do not match the size of the graphic user interface display, the method can change the magnification of the distinct regions of text (up or down) to compensate for size differences between set graphic user interface display and the distinct regions of text (in item 106, for example). For example region 200 may be too wide for some displays.

Figure 3:
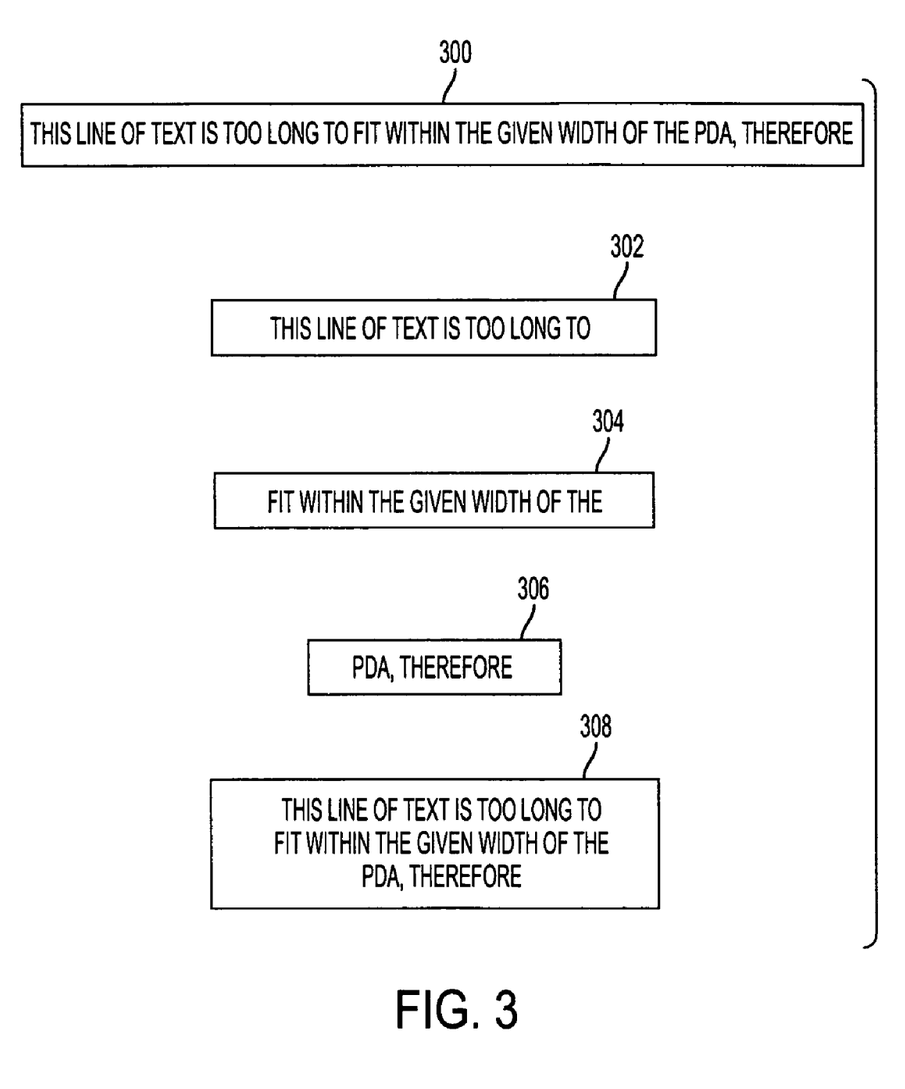
FIG. 3 is a schematic representation of processing an image of a line of text.

Alternatively, if the distinct regions of text are too large for the graphic user interface display, the method (in item 106) can divide the images of individual lines of text into two or more sections, and simultaneously display all sections of a line of text (one below another) to allow the user to simultaneously view a complete line of text (possibly in multiple sections) on the graphic user interface display. Therefore, as shown in FIG. 3 for example, if one of the regions of text (e.g., a first region 200) has a width greater than a width of the graphic user interface display (and possibly no reduction of magnification of the image can clearly show the entire line of text on the graphic user interface display because of its width), the method separates sub-images of text lines within this first region of text. One of the lines of text is shown as item 300. Item 300 is an image, made up of pixels, of one of the lines within the first region 200. Then, when displaying this region of text, the displaying process can split each of the sub-images of text lines into at least two portions, such that a first portion of each of the sub-images of text lines is displayed above a corresponding second portion of the sub-images of text lines. For example, this processes splits image 300 into images 302, 304, and 306. Those images (302, 304, 306) are displayed simultaneously on the graphic user interface, as shown in item 308. Note that item 308 actually displays three separate images. By splitting each of the sub-images of the text lines, all portions of at least one text line from the first region are simultaneously visible on the graphic user interface display.

In another exemplary embodiment, the method can identify the distinct regions of text as side-by-side columns (e.g., regions 202 and 204). In such a situation, the ordering process and the displaying process change the presentation (ordering) of the columns such that the columns are displayed above (region 202) and below (region 204) each other instead of side-by-side. Thus, embodiments herein process images so as to discern the columns of the article and concatenate the columns to present a continuous readable column of text. This provides a continuous column of text that allows the user to read down the document by scrolling in one direction without having to scroll up and down multiple times to read a single article.

A system embodiment herein comprises the scanner shown in FIG. 5 that is adapted to acquire an image containing text and a document analyzer 500 in communication with the scanner. The document analyzer 500 is adapted to identify distinct regions of text within the image. Further, the pixel storage and processing unit 502 is in communication with the document analyzer 500. The pixel storage and processing unit 502 is adapted to generate sub-images from the image according to the distinct regions of text. The central processor 504 is in communication with the pixel storage and processing unit 504 and is adapted to order the sub-images according to a predetermined order. Finally, the graphic user interface 50 is in communication with the processor and is used to display the regions of text in the predetermined order.

Each of the circuits, routines, applications, modules or the like outlined above can be implemented as software that is stored on a computer-readable medium and that is executable on a programmed general purpose computer, a programmed special purpose computer, a programmed microprocessor, a programmed digital signal processor or the like. Alternatively, each of the circuits, routines, applications, objects, procedures, managers and/or modules above can be implemented as physically distinct hardware circuits within an ASIC, using a digital signal processor DSP, using an FPGA, a PLD, a PLA and/or a PAL, or using discrete logic elements or discrete circuit elements. The particular form the circuits, routines, applications, objects, procedures, managers and/or modules will take is a design choice and it will be obvious and predictable to those skilled in the art. The circuits, routines, applications, objects, procedures, managers and/or modules do not need to be of the same design.

The method and system presented herein makes the graphic user interface more user-friendly by potentially changing the manner (order) in which the regions of text are displayed. In other words, the method re-orders images of text so that they can be read from top to bottom, without having to continually jump from one area of the image to another area of the image, as occurs when reading text printed in columns on a graphic user interface display that is too small to clearly display all columns simultaneously. While embodiments herein can be used with optical character recognition (OCR) processes, one feature is that the method can avoid the need to recognize characters within the regions of text. Therefore, in some embodiments, the method presented herein avoids the overhead and resource consumption associated with optical character recognition and, instead, creates separate sub-images of the different regions of text within the image and displays these sub-images in the most easily readable order.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A method of rearranging a display of text within an image containing text, said method comprising:
acquiring an image containing text by a solid-state image sensor;
using a computer processor to:
identify distinct regions of text within said image;
generate sub-images from said image according to said distinct regions of text; and
order said sub-images according to a predetermined order; and
displaying said sub-images in said predetermined order on a graphical display device.

2. The method according to claim 1, wherein said predetermined order comprises a linguistic reading order progression of items for a given language.

3. The method according to claim 1, wherein said computer orders said sub-images by:
ranking items on a left side of said image higher than items on a right side of said image; and
ranking items at a top of said image higher then items at a bottom of said image.

4. The method according to claim 1, wherein said computer detects an orientation of said image.

5. The method according to claim 1, wherein said computer displays by:
comparing a size of a graphic user interface display with a size of said distinct regions of text; and changing a magnification of said distinct regions of text to compensate for size differences between said graphic user interface display and said distinct regions of text.

6. The method according to claim 1, wherein said computer identifies said distinct regions by comparing said image to a document model.

7. The method according to claim 1, wherein said method avoids recognizing characters within said regions of text.

8. A method of rearranging a display of text within an image containing text, said method comprising:
   acquiring an image containing text by a solid-state image sensor;
   using a computer processor to:
      identify distinct regions of text within said image;
      generate sub-images from said image according to said distinct regions of text; and
      order said sub-images according to a predetermined order; and
   displaying said sub-images in said predetermined order on a graphical display device,
   wherein if said computer identifies side-by-side columns, said computer changes a presentation of said columns such that said columns are displayed on said graphical display device above and below each other instead of side-by-side.

9. The method according to claim 8, wherein said predetermined order comprises a linguistic reading order progression of item for a given language.

10. The method according to claim 8, wherein said computer orders said sub-images by:
   ranking items on a left side of said image higher than items on a right side of said image; and
   ranking items at a top of said image higher then items at a bottom of said image.

11. The method according to claim 8, wherein said computer detects an orientation of said image.

12. The method according to claim 8, wherein said computer displays by:
   comparing a size of a graphic user interface display with a size of said distinct regions of text; and
   changing a magnification of said distinct regions of text to compensate for size differences between said graphic user interface display and said distinct regions of text.

13. The method according to claim 8, wherein said computer identifies said distinct regions by comparing said image to a document model.

14. The method according to claim 8, wherein said method avoids recognizing characters within said regions of text.

15. A method of rearranging a display of text within an image containing text, said method comprising:
   acquiring an image containing text by a solid-state image sensor;
   using a computer processor to:
      identify distinct regions of text within said image;
      generate sub-images from said image according to said distinct regions of text;
      compare a size of a graphic user interface display with a size of said distinct regions of text;
      if a first region of text of said distinct regions of text has a width greater than a width of said graphic user interface display, generate sub-images of text lines within said first region of text; and
      order said sub-images according to a predetermined order; and
   displaying said sub-images in said predetermined order on a graphical display device, such that when displaying said first region of text, said computer splits each of said sub-images of text lines such that a first portion of each of said sub-images of text lines is displayed on said graphical display device above a corresponding second portion of said sub-images of text lines.

16. The method according to claim 15, wherein by splitting each of said sub-images of said text lines, all portions of an image of a text line from said first region are simultaneously displayed on said graphic user interface display.

17. The method according to claim 15, wherein said predetermined order comprises a linguistic reading order progression of items for a given language.

18. The method according to claim 15, wherein said computer orders said sub-images by:
   ranking items on a left side of said image higher than items on a right side of said image; and
   ranking items at a top of said image higher then items at a bottom of said image.

19. A computer-readable medium storing instructions that, when executed by a computer, cause the computer to perform a method comprising:
   acquiring an image containing text by a solid-state image sensor;
   identifying distinct regions of text within said image;
   generating sub-images from said image according to said distinct regions of text;
   ordering said sub-images according to a predetermined order; and
   displaying said sub-images in said predetermined order on a graphical display device.

20. A system comprising:
   a scanner adapted to acquiring an image containing text;
   a document analyzer in communication with said scanner, wherein said document analyzer is adapted to identify distinct regions of text within said image;
   a pixel storage and processing unit in communication with said document analyzer, wherein said pixel storage and processing unit is adapted to generate sub-images from said image according to said distinct regions of text;
   a processor in communication with said pixel storage and processing unit, wherein said processor is the adapted to order said sub-images according to a predetermined order; and
   a graphic user interface in communication with said processor, wherein said graphic user interface is adapted to display said sub-images in said predetermined order.

* * * * *